(No Model.)
T. G. PELTON.
EXPANDING ROSE BIT.
No. 270,554. Patented Jan. 9, 1883.
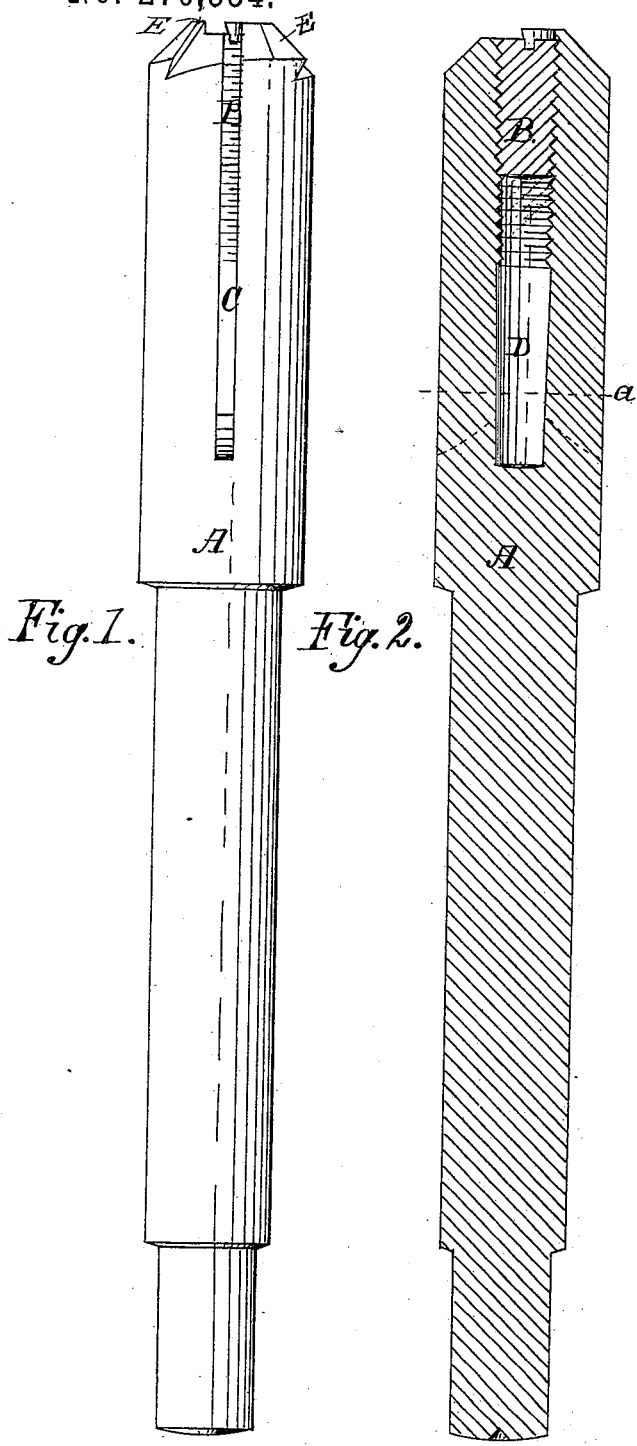
Witnesses:
H. A. Daniels
G. B. Towles
Inventor
Theodore G. Pelton
By W. Burris Atty

UNITED STATES PATENT OFFICE.

THEODORE G. PELTON, OF LYONS, IOWA, ASSIGNOR OF ONE-HALF TO JERRY M. PELTON, OF SAME PLACE.

EXPANDING ROSE-BIT.

SPECIFICATION forming part of Letters Patent No. 270,554, dated January 9, 1883.

Application filed July 29, 1882. (No model.)

*To all whom it may concern:*

Be it known that I, T. G. PELTON, a citizen of the United States of America, residing at Lyons, in the county of Clinton and State of Iowa, have invented certain new and useful Improvements in Rose-Expanding Reamers, of which the following is a specification, reference being had therein to the accompanying drawings.

My invention consists of an expansible reamer, the body of which is constructed of one piece of steel, having a central tapered hole and lateral slots, the tapered hole being provided with a tapered set-screw, whereby the cutting end of the reamer may be expanded within the limits of the spring of the metal.

Figure 1 is side view of the reamer. Fig. 2 is a longitudinal section on line $b$ of Fig. 4. Fig. 3 shows the cutting end. Fig. 4 is a cross-section on line $a$ of Fig. 2.

The main body of the reamer A is made of one piece of steel, and a central tapered hole, D, is drilled therein the required depth to allow the requisite spring for the expansion of the cutting end of the reamer, the walls of said hole being screw-threaded. The tapered screw is then fitted in the tapered hole. The screw is then removed, and the slots $c$ cut through the body of the drill, extending laterally from the outside to the central hole, and longitudinally the length of the hole. E represents the cutting-lips.

It is well known to be difficult to drill through an iron substance a hole the exact size required. This tool, which is very simple and readily constructed, is designed to relieve that difficulty.

To illustrate its use, take, for example, an iron pulley to be fitted on a straight shaft and drill through the pulley a hole slightly less than the size of the shaft. Then take one of these expansible drills, the normal size of which is slightly less than the required hole, and by means of the set-screw expand carefully the cutting end, being careful it is not larger than the required size, and ream out the hole; and by several trials the reamer may thus be expanded to the exact size to ream the hole to fit the shaft closely or loosely, as required.

The natural elasticity of the metal will allow the reamer to be expanded about one-eighth of an inch, and by having a set of graduated sizes of these reamers, a hole of any required size may be readily made.

What I claim as new, and desire to secure by Letters Patent, is—

The herein-described expansible rose-bit, divided longitudinally in three equal bearing parts by the side slots, $c$, and the central hole, D, and having its cutting lips or points E at the end of the bit, and provided with the tapered screw B, substantially as and for the purposes set forth.

In testimony whereof I affix my signature in presence of two witnesses.

THEODORE G. PELTON.

Witnesses:
W. W. SANBORN,
J. M. PELTON.